(12) United States Patent
Albright et al.

(10) Patent No.: US 7,798,260 B2
(45) Date of Patent: Sep. 21, 2010

(54) TRACK VEHICLE HAVING DRIVE AND SUSPENSION SYSTEMS

(75) Inventors: Larry E. Albright, Underwood, MN (US); Gary J. Homola, Lisbon, ND (US); Maria C Homola, legal representative, Lisbon, ND (US); Rodney Koch, Mooreton, ND (US); Lance Tuhy, Fargo, ND (US); Thomas J. Roan, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 325 days.

(21) Appl. No.: 11/843,331

(22) Filed: Aug. 22, 2007

(65) Prior Publication Data
US 2009/0050379 A1  Feb. 26, 2009

(51) Int. Cl.
*B62D 55/104* (2006.01)
(52) U.S. Cl. .......................................... 180/6.7; 180/9.1
(58) Field of Classification Search .................. 180/6.7, 180/9.1
See application file for complete search history.

(56) References Cited

U.S. PATENT DOCUMENTS

| | | |
|---|---|---|
| 1,442,570 A | 1/1923 | Holt |
| 2,592,541 A | 4/1952 | Curtis |
| 2,599,233 A | 6/1952 | Christie |
| 2,786,724 A | 3/1957 | Armington et al. |
| 2,833,361 A | 5/1958 | Schwartz |
| 2,864,452 A | 12/1958 | Guntert et al. |
| 3,096,840 A | 7/1963 | Mazzarins |
| 3,117,647 A | 1/1964 | Polko |
| 3,313,167 A | 4/1967 | Wiese |
| 3,451,728 A | 6/1969 | Bruneau |
| 3,472,563 A | 10/1969 | Irgens |
| 3,575,474 A | 4/1971 | Russ, Sr. |
| 3,664,449 A | 5/1972 | Vardell |
| 3,688,858 A | 9/1972 | Jespersen |

(Continued)

FOREIGN PATENT DOCUMENTS

GB  770502  3/1957

(Continued)

OTHER PUBLICATIONS

International Search Report and Written Opinion.

*Primary Examiner*—Lesley Morris
*Assistant Examiner*—Michael R Stabley
(74) *Attorney, Agent, or Firm*—Westman, Champlin & Kelly, P.A.

(57) ABSTRACT

A track vehicle includes a cab operable to support an operator. Left and right motors each rotate an output shaft at a first speed, and a speed reduction system is operably coupled to each output shaft. Left and right drive shafts are driven by the speed reduction system at a second speed that is slower than the first speed. Left and right drive sprockets are mounted for rotation with the respective first and second drive shafts. Left and right track carriages support the cab and left and right tracks are mounted for rotation about the track carriages in response to rotation of the respective left and right drive shafts, such that the left and right tracks are driven by the left and right drive sprockets to move the track vehicle along a ground surface.

12 Claims, 5 Drawing Sheets

U.S. PATENT DOCUMENTS

| | | | |
|---|---|---|---|
| 3,722,962 A | 3/1973 | Cooper | |
| 3,774,708 A | 11/1973 | Purcell et al. | |
| 3,826,325 A * | 7/1974 | Purcell et al. | 180/9.54 |
| 3,840,082 A * | 10/1974 | Olson | 180/9.5 |
| 3,853,016 A | 12/1974 | Lane, III et al. | |
| 3,888,132 A | 6/1975 | Russ, Sr. | |
| 3,948,110 A | 4/1976 | Lassanske | |
| 3,948,572 A | 4/1976 | Korner et al. | |
| 4,072,062 A | 2/1978 | Morling et al. | |
| 4,097,093 A * | 6/1978 | Shelby et al. | 305/125 |
| 4,147,218 A | 4/1979 | Stedman | |
| 4,218,932 A | 8/1980 | McComber | |
| 4,415,055 A | 11/1983 | Ahn | |
| 4,431,073 A | 2/1984 | Nagao et al. | |
| 4,437,528 A | 3/1984 | Koehler et al. | |
| 4,572,311 A | 2/1986 | Oswald et al. | |
| 4,739,852 A | 4/1988 | Stevens et al. | |
| 4,805,388 A | 2/1989 | Kell | |
| 4,836,318 A | 6/1989 | Tonsor et al. | |
| 4,846,092 A | 7/1989 | Wilson | |
| 4,874,052 A * | 10/1989 | Purcell et al. | 180/9.1 |
| 4,881,609 A * | 11/1989 | Purcell et al. | 180/9.5 |
| 4,962,821 A | 10/1990 | Kim | |
| 5,005,921 A | 4/1991 | Edwards et al. | |
| 5,005,922 A | 4/1991 | Edwards et al. | |
| 5,131,484 A | 7/1992 | Carra et al. | |
| 5,171,074 A | 12/1992 | Seksaria et al. | |
| 5,183,287 A | 2/1993 | VanSweden | |
| 5,190,363 A | 3/1993 | Brittain et al. | |
| 5,279,378 A | 1/1994 | Grawey et al. | |
| 5,320,585 A | 6/1994 | Kato | |
| 5,343,960 A * | 9/1994 | Gilbert | 172/823 |
| 5,358,064 A | 10/1994 | Oertley | |
| 5,363,936 A | 11/1994 | Grawey et al. | |
| 5,373,909 A | 12/1994 | Dow et al. | |
| 5,409,305 A | 4/1995 | Nagorcka | |
| 5,447,365 A | 9/1995 | Muramatsu et al. | |
| 5,466,056 A | 11/1995 | James et al. | |
| 5,472,563 A | 12/1995 | Kogawa et al. | |
| 5,484,321 A | 1/1996 | Ishimoto | |
| 5,505,274 A | 4/1996 | Satzler | |
| 5,533,587 A | 7/1996 | Dow et al. | |
| 5,533,796 A | 7/1996 | Beeley | |
| 5,540,489 A | 7/1996 | Muramatsu et al. | |
| 5,622,234 A * | 4/1997 | Nagorcka et al. | 180/9.5 |
| 5,676,436 A | 10/1997 | Hart | |
| 5,707,123 A | 1/1998 | Grob | |
| 5,722,745 A | 3/1998 | Courtemanche et al. | |
| 5,752,574 A | 5/1998 | Oertley | |
| 5,769,512 A | 6/1998 | Kautsch | |
| 5,791,429 A | 8/1998 | Bergman | |
| 5,839,802 A | 11/1998 | Sheets | |
| 5,853,233 A | 12/1998 | Turner | |
| 5,899,164 A | 5/1999 | Coast | |
| 5,899,541 A | 5/1999 | Ying et al. | |
| 5,984,438 A | 11/1999 | Tsunoda et al. | |
| 5,997,109 A | 12/1999 | Kautsch | |
| 6,012,784 A | 1/2000 | Oertley | |
| 6,065,818 A | 5/2000 | Fischer | |
| 6,074,025 A | 6/2000 | Juncker et al. | |
| 6,076,901 A | 6/2000 | Rankin et al. | |
| 6,120,405 A | 9/2000 | Oertley et al. | |
| 6,123,399 A | 9/2000 | Snyder | |
| 6,132,133 A * | 10/2000 | Muro et al. | 404/102 |
| 6,135,220 A | 10/2000 | Gleasman et al. | |
| 6,139,121 A | 10/2000 | Muramatsu | |
| 6,158,539 A * | 12/2000 | Isley | 180/89.14 |
| 6,173,973 B1 | 1/2001 | Robinson | |
| 6,199,646 B1 * | 3/2001 | Tani et al. | 180/9.21 |
| 6,203,127 B1 | 3/2001 | Chapman | |
| 6,220,378 B1 | 4/2001 | Oertley et al. | |
| 6,234,590 B1 | 5/2001 | Satzler | |
| 6,241,327 B1 | 6/2001 | Gleasman et al. | |
| 6,250,726 B1 | 6/2001 | Burdick et al. | |
| 6,276,768 B1 | 8/2001 | Miller | |
| 6,322,473 B1 | 11/2001 | Burdick et al. | |
| 6,425,450 B1 | 7/2002 | Lansberry | |
| 6,435,292 B2 | 8/2002 | Lemke et al. | |
| 6,634,653 B2 | 10/2003 | Chatterjea | |
| 6,715,575 B2 | 4/2004 | Karpik | |
| 6,904,986 B2 * | 6/2005 | Brazier | 180/9.21 |
| 7,017,688 B2 * | 3/2006 | Bowers et al. | 180/9.54 |
| 7,194,858 B2 | 3/2007 | Ziph et al. | |
| 7,255,184 B2 * | 8/2007 | Loegering et al. | 180/9.26 |
| 7,552,785 B2 * | 6/2009 | Tuhy | 180/9.58 |
| 7,562,727 B1 * | 7/2009 | Hoffart | 180/9.1 |
| 2004/0045747 A1 * | 3/2004 | Albright et al. | 180/9.1 |
| 2005/0284711 A1 | 12/2005 | Skaggs | |
| 2006/0075750 A1 | 4/2006 | Evans | |
| 2006/0101815 A1 | 5/2006 | Kobayashi et al. | |
| 2006/0113121 A1 | 6/2006 | Radke | |

FOREIGN PATENT DOCUMENTS

| | | |
|---|---|---|
| JP | 10194169 | 7/1998 |
| WO | WO 03/076217 | 9/2003 |
| WO | 2004016494 | 2/2004 |

\* cited by examiner

TRACK VEHICLE HAVING DRIVE AND SUSPENSION SYSTEMS

BACKGROUND

The present invention relates to construction vehicles. Specifically, compact track loaders that include suspension systems.

In the past, track vehicles have not had suspension systems. Instead, axles and wheels support the track for rotation and the vehicle frame is welded to these axles. Also, track vehicles are often provided with high-torque, low-speed motors, which are typically large and expensive.

SUMMARY

In one embodiment, the invention provides a track vehicle comprising: a cab operable to support an operator; left and right motors each rotating an output shaft at a first speed; a speed reduction system operably coupled to each output shaft; left and right drive shafts being driven by the speed reduction system at a second speed that is slower than the first speed; left and right drive sprockets mounted for rotation with the respective left and right drive shafts; left and right track carriages supporting the cab; and left and right tracks mounted for rotation about the track carriages in response to rotation of the respective left and right drive shafts, wherein the left and right tracks are driven by the left and right drive sprockets to move the track vehicle along a ground surface.

In another embodiment the invention provides a track vehicle comprising: a frame operable to support an operator; first and second motors rotating respective output shafts; first and second drive shafts being driven in response to rotation of the output shafts; first and second drive sprockets mounted for rotation with the drive shafts; first and second track carriages supporting the frame; a speed reduction system coupled between the output shafts and the drive shafts, such that the drive shafts are rotated at a slower speed than the output shafts speed of rotation; and first and second tracks mounted for rotation about the track carriages in response to rotation of the drive sprockets, wherein the first and second tracks are rotated around the respective first and second track carriages in response to the first and second motors, such that the track vehicle is moveable along a ground surface, in response to the movement of the first and second tracks.

In another embodiment the invention provides a method of operating a track vehicle having a body frame, first and second motors having first and second motor shafts, respectively, first and second track carriages pivotally mounted to the body frame, first and second tracks rotatable around the respective first and second track carriages, first and second track drive shafts rotatable to cause rotation of the first and second tracks about the first and second track carriages, a first speed reduction system interconnected between the first motor shaft and the first track drive shaft, and a second speed reduction system interconnected between the second motor shaft and the second track drive shaft. The method comprises operating the first and second motors at first speeds; driving the first and second track drive shafts through the respective first and second speed reduction systems at second speeds slower than the first speeds; driving rotation of the first and second tracks around the respective first and second track carriages in response to rotation of the respective first and second track drive shafts; and pivoting the carriages with respect to the body frame.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
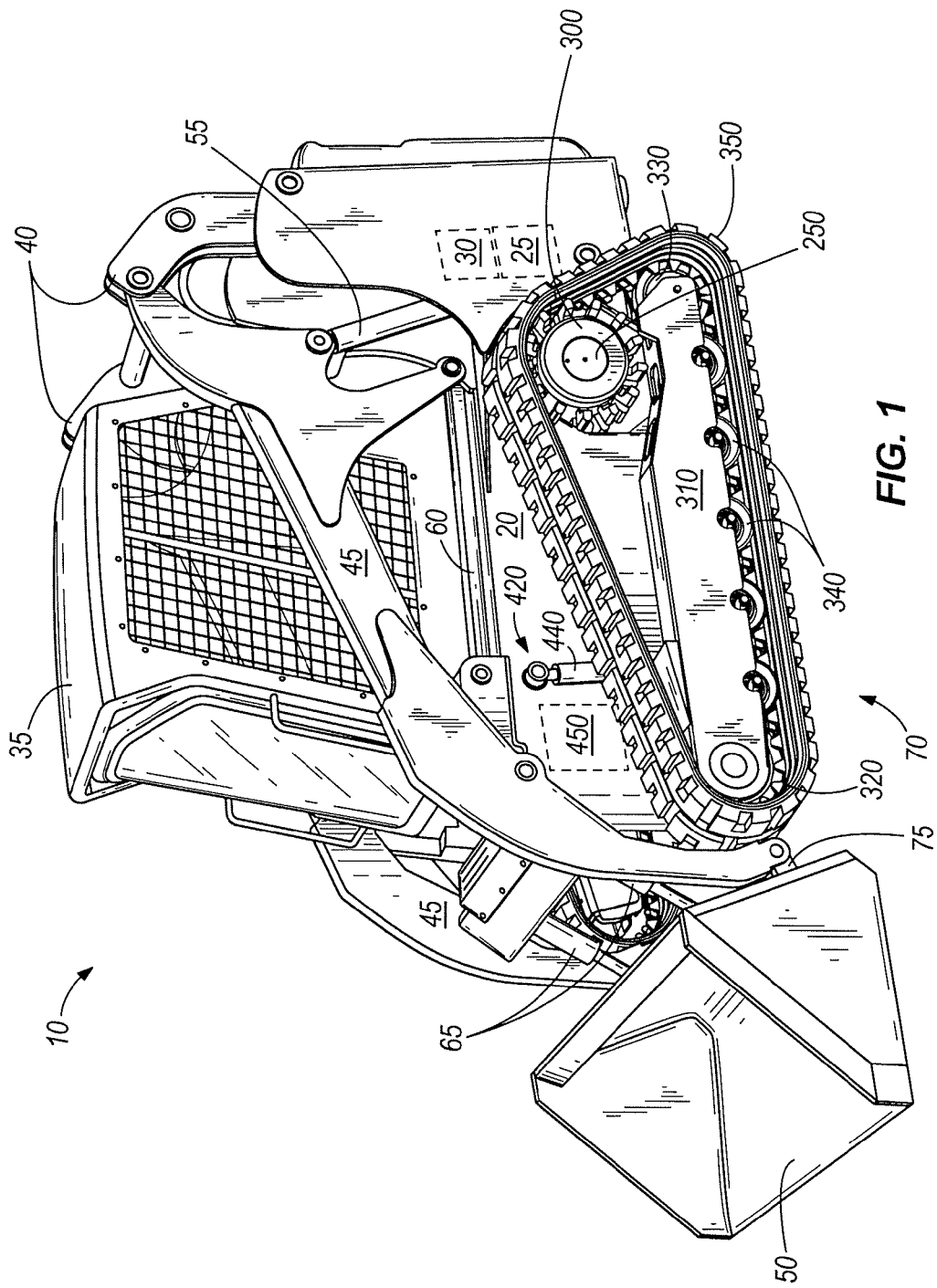
FIG. 1 is a perspective view of a track vehicle.

FIG. 1 illustrates a compact track loader vehicle 10 according to one embodiment of the invention. Although the invention is illustrated as embodied in a compact track loader 10, it may also be embodied in other track vehicles. The compact track loader 10 includes a body frame 20, a hydraulic system 25, an engine 30, a cab 35, a pair of support arms or masts 40, a pair of lift arms 45, a bucket 50, a pair of lift actuators 55, a pair of support links 60, a pair of attachment actuators 65, and a pair of track carriages or assemblies 70 (one on each of the opposite sides of the compact track loader 10).

The engine 30 drives one or more hydraulic pumps within the hydraulic system 25, and the pumps provide a flow of hydraulic fluid to the actuators 55, 65 and hydraulic drive systems to operate the track assemblies 70 (discussed in more detail below). The operator controls the hydraulic drive system 25, and therefore operates the compact track loader 10, with controls in the cab 35. In some embodiments, the controls move spool valves (not shown) to direct the hydraulic fluid to the lift actuators 55 and the attachment actuators 65. The support arms 40 are pivotally mounted to the body frame 20, the lift arms 45 are pivotally mounted to the support arms 40, and an attachment interface 75 is pivotally mounted to the lift arms 45. The lift actuators 55 are interconnected between the lift arms 45 and the body frame 20 and extend and retract in response to the operator's control of the hydraulic system 25 to cause the lift arms 45 to pivot in raising and lowering directions with respect to the support arms 40 and body frame 20. The support links 60 provide additional support and stability to the lift arms 45.

The attachment actuators 65 are interconnected between the lift arms 45 and the attachment interface 75, and extend and retract in response to the operator's control of the hydraulic system 25 to pivot the bucket 50 in curling and dumping directions with respect to the lift arms 45. Although the illustrated attachment is a bucket 50, the compact track loader may in other embodiments include other attachments, including without limitation, augers, jack hammers, trenchers, grapples, rotary sweepers, stump grinders, saws, concrete mixers, pumps, chippers, snow throwers, rotary cutters, and backhoes. With other attachments, the attachment actuators 65 may be used to raise, lower, tilt, or pivot the attachments for their intended purposes.

Figure 2:
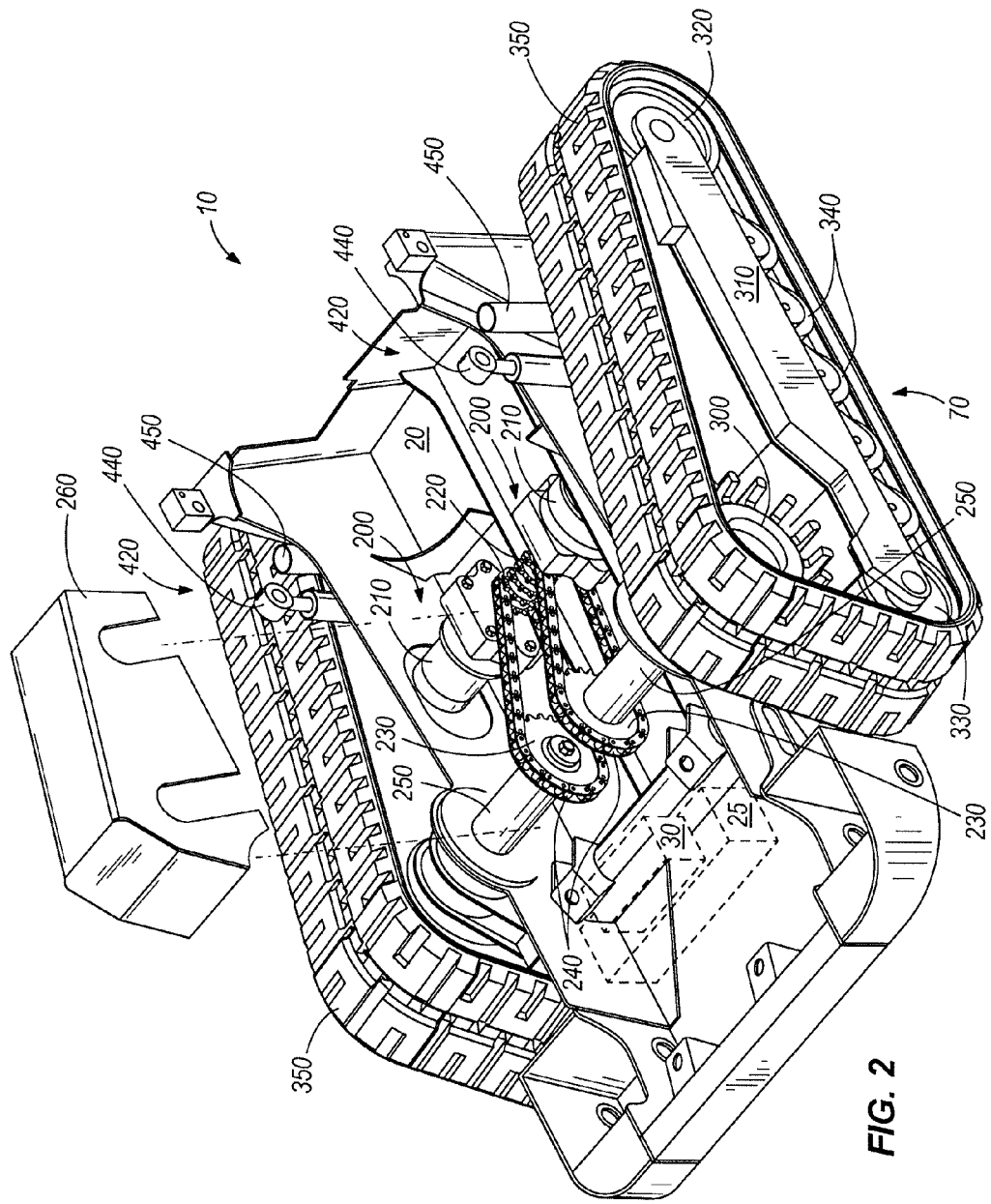
FIG. 2 is a partially exploded perspective view of a first track drive arrangement for the track vehicle.

Turning now to FIG. 2, a pair (e.g., left and right) of hydraulic drive systems 200 are mounted within the body frame 20. Each hydraulic drive system 200 includes a hydraulic motor 210, a small chain sprocket 220, a large chain sprocket 230, a chain 240 extending around the small and large chain sprockets 220, 230, and a track drive shaft 250. The flow of hydraulic fluid in the hydraulic system 25 drives operation of the left and right hydraulic motors 210. The small chain sprockets 220 are mounted to the output shafts of the motors 210 and rotate in response to operation of the motors 210. The chains 240 transfer torque from the left and right small chain sprockets 220 to the respective left and right large chain sprockets 230, to cause rotation of the large chain sprockets 230. The large chain sprockets 230 are mounted for rotation with the track drive shafts 250, and the track drive shafts 250 therefore rotate in response to rotation of the large chain sprockets 230 under the influence of the motors 210. The small chain sprocket 220, large chain sprocket 230, and chain 240 may be referred to as a speed reduction system operable to transfer torque from the motor 210 output shafts to the track drive shafts 250. Other speed reduction systems, including but not limited to gear trains and pulley and belt systems, may be used in the present invention and the illustrated speed reduction system should not be regarded as limiting. The speed reduction derived from driving the large chain sprockets 230 off of the small chain sprockets 220 increases the torque output on the track drive shafts 250. Consequently, high speed, low torque motors can be used as the motors 210.

Figure 3:
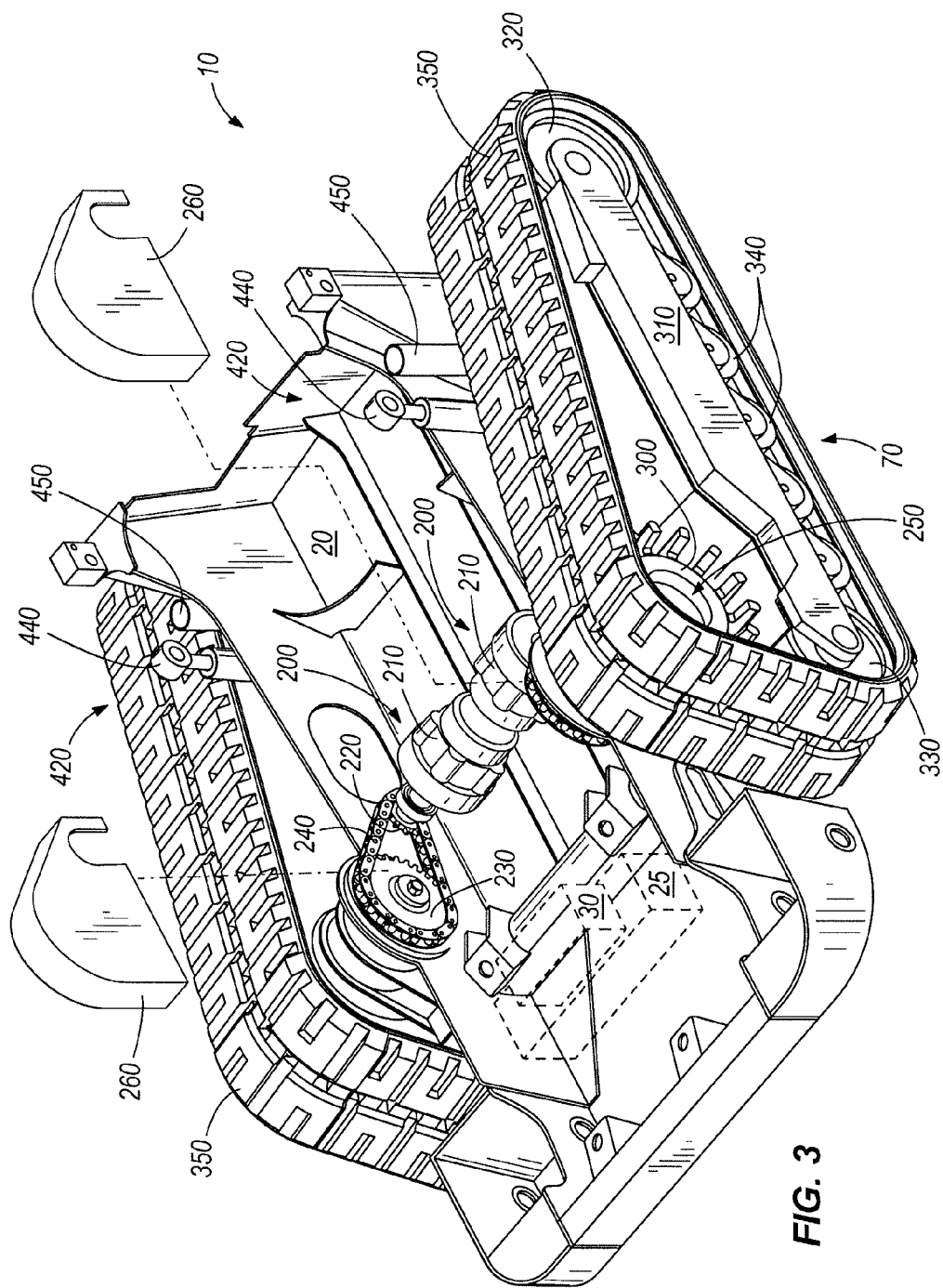
FIG. 3 is a partially exploded perspective view of a second track drive arrangement for the track vehicle.

FIG. 3 illustrates an alternate configuration of the drive system 200 in which the motors 210 are positioned in the middle of the body frame 20 and the chains 240 run along the inner sides of the side walls of the body frame 20. In this regard, the configuration illustrated in FIG. 2 may be termed a "center mounted" chain reduction and the configuration illustrated in FIG. 3 may be termed a "side mounted" chain reduction. Both configurations may employ chain covers 260 to cover the chain reductions. Both the center mounted and the side mounted chain reduction configurations and the respective chain covers 260 are mounted to the body frame 20 within the footprint of the cab 35. The footprint of the cab is herein defined as being contained within a vertical projection of the cab 35.

With continued reference to FIGS. 2 and 3, each (e.g., left and right) track assembly 70 includes a drive sprocket 300, a track frame 310, front and rear driven sprockets 320, 330, a plurality of rollers 340, and a track 350. The left and right drive sprockets 300 are fixed for rotation with the respective left and right track drive shafts 250, and engage lugs on the inner surface of the track 350 to cause to the track to rotate around the track frame 310. The front and rear driven sprockets 320, 330 and rollers 340 are mounted to the track frame 310 and maintain tension in the track 350 and may be configured to bias the track into engagement with the ground.

Figure 4:
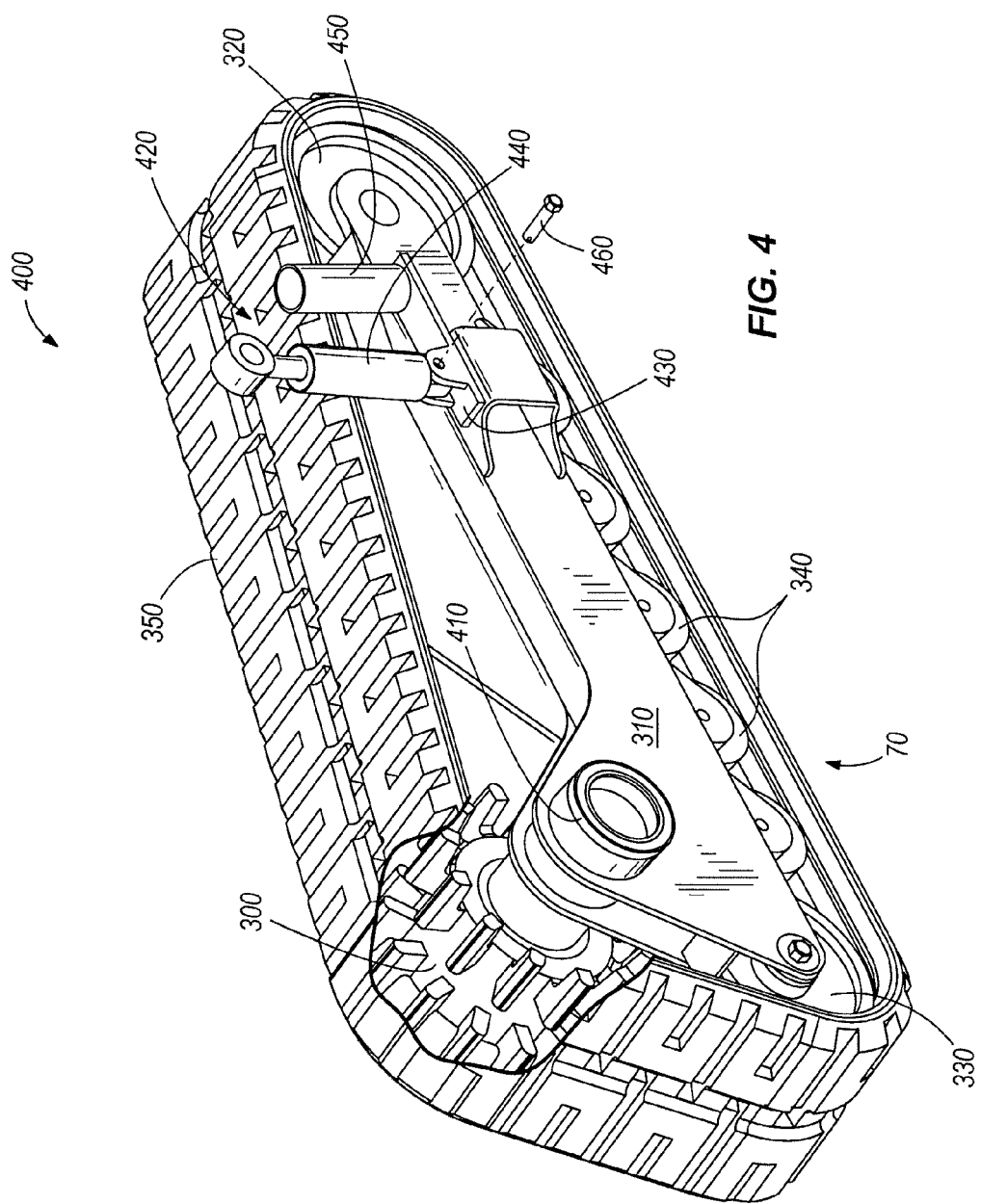
FIG. 4 is a perspective view of one of the track carriages of the track vehicle, including a first suspension system arrangement.
Figure 5:
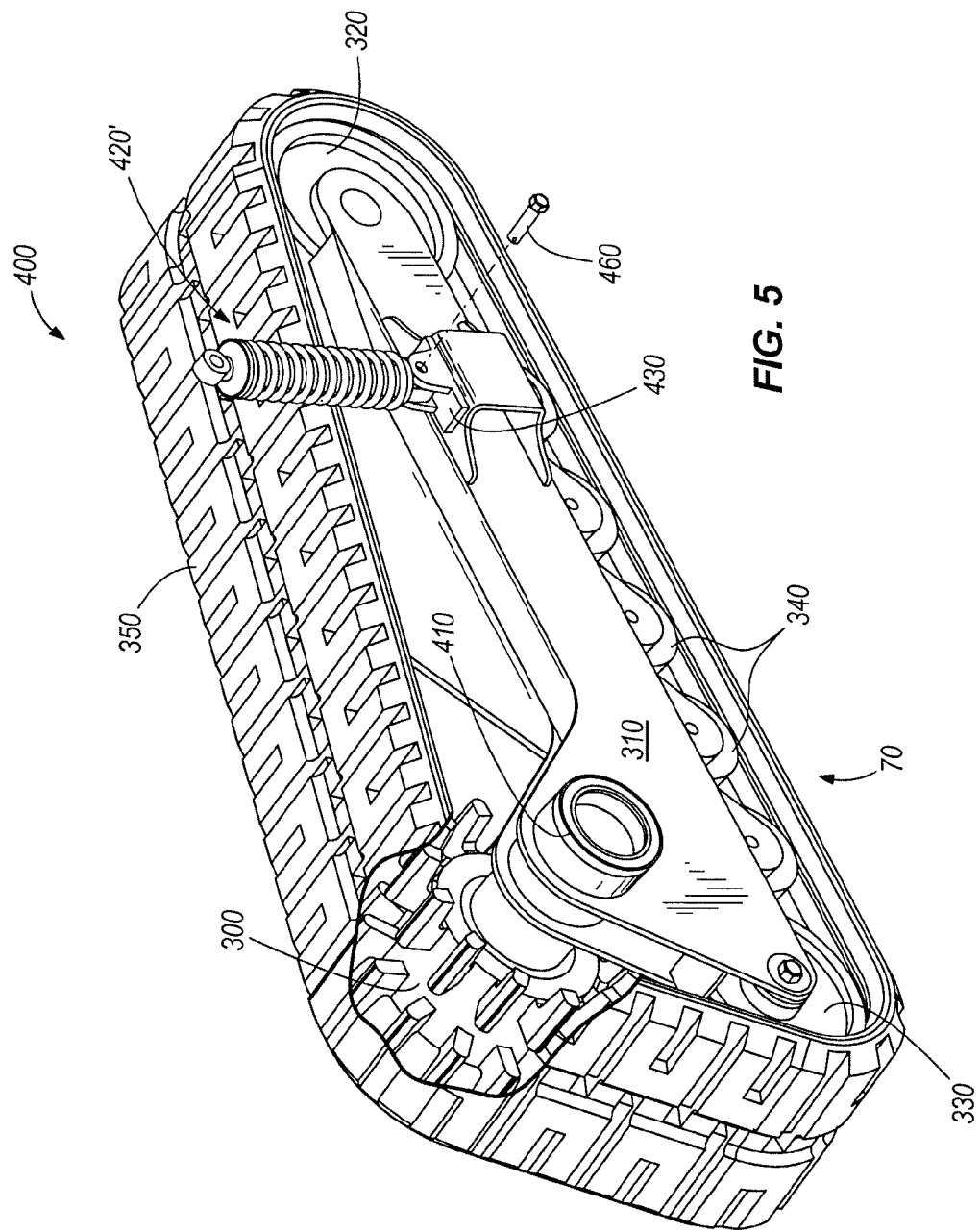
FIG. 5 is a perspective view of one of the track carriages of the track vehicle, including a second suspension system arrangement.

Turning now to FIGS. 4 and 5, the vehicle includes left and right suspension systems 400 associated with the respective left and right track assemblies 70. Each suspension system 400 includes a swivel bearing 410 mounted toward the rear of the track frame 310 and a shock assembly 420, 420' mounted on a bracket 430 that is rigidly mounted to a front portion of the track frame 310. The swivel bearing 410 extends around the track drive shaft 250 and facilitates pivoting of the track assembly 70 about the track drive shaft 250.

The shock assembly 420 illustrated in FIG. 4 is of a type that has a piston and cylinder shock 440 and an accumulator 450. In the illustrated embodiment, the bottom of the shock 440 is secured by way of a pin 460 to the bracket 430, and the top of the shock 440 is connected to the cab 35. The as the track assemblies 70 pivot with respect to the body frame 20, up and down over rough terrain, the shock assemblies 420 absorb vertical movement by actuation of the shock 440. Sudden impacts are further absorbed by displacing fluid in the accumulator 450. The accumulator 450 may be taken out of communication (e.g., by closing a valve) with the shock 440 to create a stiff suspension. The shock assembly 420' illustrated in FIG. 5 is of a type having a shock and a coil spring to provide spring bias and dampening functionality to the suspension system 400.

The shock assemblies 420, 420' are similar to ride control systems used to absorb bouncing movement of the boom of a construction vehicle as the vehicle travels. Examples of such ride control systems are described in U.S. Pat. Nos. 6,634,653 and 7,194,858, and in U.S. Patent Application Publication Nos. 2006/0075750, 2006/0101815, and 2005/0284711, the entire contents of the foregoing patents and published patent applications being incorporated herein by reference. Additionally, suitable accumulator and valve assemblies for the shock assembly 420 are publicly available from Americorp, Inc. of New Mexico as Kit No. 7106063.

Various features and advantages of the invention are set forth in the following claims.

What is claimed is:

1. A track vehicle comprising:
    a frame and a cab on the frame operable to support an operator;
    left and right motors each rotating an output shaft at a first speed;
    a separate speed reduction system operably coupled to each output shaft;
    left and right drive shafts rotatable on the frame being driven by the respective speed reduction system at a second speed that is slower than the first speed;
    left and right drive sprockets mounted for rotation with the respective left and right drive shafts;
    left and right track carriages pivotally mounted adjacent first ends thereof to pivot about the left and right drive shafts, respectively, and positioned at outer sides of the frame, thereby supporting the cab; and
    left and right tracks mounted for movement about the track carriages in response to rotation of the respective left and right drive shafts, wherein the left and right tracks are driven by the left and right drive sprockets to move the track vehicle along a ground surface; wherein the speed reduction systems include left and right relatively small diameter chain sprockets mounted to the output shafts of the respective left and right motors, left and right relatively large diameter chain sprockets mounted to the respective left and right drive shafts, and left and right chains coupling the respective left small and large chain sprockets and the right small and large chain sprockets such that the drive shafts rotate at slower speed and higher torque than the motor output shafts, all portions of the speed reduction systems being within the frame and between the left and right track carriages.

2. The track vehicle of claim 1, further comprising a suspension system between the track carriages and the cab that supports the track carriages at locations spaced from the pivotal mounting of the track carriages and permits relative pivotal motion of second ends of the left and right track carriages relative to the cab.

3. The track vehicle of claim 2, wherein the suspension system includes left and right bearings that support the respective left and right track carriages for pivotal movement about the respective left and right drive shafts, and left and right shock assemblies mounted between the respective left and right track carriages and the cab to reduce the transmission of impact forces from the left and right track carriages to the cab as the vehicle travels over rough terrain.

4. The track vehicle of claim 2, further comprising a mechanism for locking the suspension system to resist relative movement between the track carriages and cab.

5. The track vehicle of claim 1, wherein the motors are positioned between the left and right track carriages; and wherein the chains extend between the motors.

6. The track vehicle of claim 1, wherein the motors are positioned between the left and right track carriages; and wherein the motors are positioned between the chains.

7. A track vehicle comprising:
a frame operable to support an operator;
first and second motors rotating respective output shafts;
first and second drive shafts on the frame being driven in response to rotation of the output shafts;
first and second drive sprockets mounted for rotation with the drive shafts
first and second track carriages pivotally mounted about the first and second drive shafts respectively and supporting the frame;
speed reduction systems coupled between the output shafts and the drive shafts, such that the drive shafts are rotated at a slower speed than the output shafts speed of rotation; and
first and second tracks mounted for movement about the track carriages in response to rotation of the drive sprockets, wherein the first and second tracks are moved around the respective first and second track carriages in response to the first and second motors, such that the track vehicle is moveable along a ground surface, in response to the movement of the first and second tracks; wherein the speed reduction system includes first and second relatively small diameter chain sprockets mounted to the output shaft of the respective first and second motors, first and second relatively large diameter chain sprockets mounted to the respective first and second drive shafts, and first and second chains coupling the respective first small and large chain sprockets and the second small and large chain sprockets such that the drive shafts rotate at slower speed and higher torque than the motor output shafts.

8. The track vehicle of claim 7, further comprising a suspension system operable to support the frame on the track carriages, wherein the suspension system permits relative movement between portions of the first and second track carriages and the frame as the first and second track carriages pivot on the first and second drive shafts, respectively.

9. The track vehicle of claim 8, wherein the first and second track carriages independently support the frame by the suspension system, such the first and second track carriages move independently of one another relative to the frame.

10. The track vehicle of claim 8, wherein the suspension system includes first and second bearings that support the respective first and second track carriages for pivotal movement about the respective first and second drive shafts, and first and second shock assemblies mounted to the respective first and second track carriages and relative to the cab to reduce transmission of impact forces from the first and second track carriages to the cab as the vehicle travels over rough terrain.

11. The track vehicle of claim 8, wherein the suspension system is moveable coupled to the frame and each track carriage at locations spaced from the first and second drive shafts, respectively, to permit rotation of each track carriage about the respective drive shaft.

12. The track vehicle of claim 8, wherein the suspension is selectively inhibited from allowing relative movement between the carriages and cab during a digging operation.

* * * * *